United States Patent [19]

Goodwin

[11] 4,218,748
[45] Aug. 19, 1980

[54] APPARATUS AND METHOD FOR DIGITALLY OBTAINING SIGNALS HAVING SPECIFIED STATISTICAL DISTRIBUTIONS

[75] Inventor: R. Wendell Goodwin, Dunwoody, Ga.

[73] Assignee: Sangamo Weston, Inc., Norcross, Ga.

[21] Appl. No.: 945,162

[22] Filed: Sep. 25, 1978

[51] Int. Cl.² .......................... G06F 15/34; G06F 1/02
[52] U.S. Cl. ...................................... 364/717; 331/78
[58] Field of Search .................... 364/717, 718; 331/78

[56] References Cited

U.S. PATENT DOCUMENTS

| | | | |
|---|---|---|---|
| 3,746,847 | 7/1973 | Maritsas | 364/717 |
| 3,811,038 | 5/1974 | Reddaway | 364/717 |
| 3,885,139 | 5/1975 | Hurd | 364/717 |
| 4,078,255 | 3/1978 | Evans | 364/717 |
| 4,097,865 | 6/1978 | Jones | 331/78 |
| 4,115,657 | 9/1978 | Morgan | 331/78 |
| 4,125,898 | 11/1978 | DeHart et al. | 364/717 |

Primary Examiner—Charles E. Atkinson

[57] ABSTRACT

The disclosure is directed to an improved apparatus and method for generating a specified statistical distribution. Digital bits having properties of randomness are produced. In response to a group of the digital bits, a signal is generated which approximates the specified statistical distribution. When a particular characteristic of a group of digital bits is sensed, the generated signal is modified so as to obtain a statistical distribution that more closely approaches the specified statistical distribution.

30 Claims, 4 Drawing Figures

APPARATUS AND METHOD FOR DIGITALLY OBTAINING SIGNALS HAVING SPECIFIED STATISTICAL DISTRIBUTIONS

BACKGROUND OF THE INVENTION

This invention relates to noise generators and, more particularly, to an apparatus and method for generating a noise signal having a specified statistical distribution, such as a Gaussian distribution.

Electronic noise generators have become increasingly important for generating noise that is used for various purposes, for example testing and calibration of electronic equipment, simulations, and electronic games. Digital noise generators are considered particularly useful in that they exhibit inherent repeatability and stability. The generated digital noise may be either used directly or converted to analog noise.

A known digital technique for producing noise having a specified statistical distribution is to generate a group of random or pseudo-random binary bits, and combine the group of bits to obtain a signal having the desired statistical properties. In the copending U.S patent application Ser. No. 945,163, assigned to the same assignee as the present application, there is disclosed a technique for simultaneously generating a group of pseudo-random binary bits and for combining the bits to obtain a noise signal having Gaussian distributed amplitudes, or to obtain a noise signal which occurs at Poisson-distributed intervals. To obtain the Gaussian-distributed noise, a group of N pseudo-random binary bits, generated at each clock pulse by a pseudo-random bit generator, are summed to obtain a sum signal having a value between zero and N. The probability of obtaining any particular sum between zero and N, at a given clock pulse, is binomial, so the distribution of amplitudes of the sum signals, as a function of time, is binomial. The Central Limit Theorem states that as N (the number of binary random variables summed) gets larger, the distribution of sums approaches a Gaussian distribution.

In a digital noise generator, considerations of complexity and cost make it necessary to use a limited number of binary random variables, N, at each clock pulse. This results in the statistical distribution, obtained from the N binary variables, being an approximation of the specified statistical distribution which one desires to obtain. The approximation error is larger for smaller values of N. Accordingly, cost and complexity are necessarily traded off to some degree against the integrity of the obtained statistical distribution.

It is an object of the present invention to set forth a technique for obtaining an improved approximation of a specified statistical distribution which is to be obtained from a limited number of random variables.

SUMMARY OF THE INVENTION

The present invention is directed to an improved apparatus and method for generating a specified statistical distribution. In accordance with the invention, means are provided for producing digital bits having properties of randomness. These bits may be produced, for example, by a pseudo-random bit generator of the type set forth in the copending U.S. application Ser. No. 945,163, assigned to the same assignee as the present application. Processing means, responsive to a group of the digital bits, are provided for generating a signal which approximates the specified statistical distribution. Sensing means, also responsive to the group of digital bits, are provided for sensing at least one characteristic of the group of bits. Finally, means are provided for modifying the signal generated by the processing means whenever the at least one characteristic is sensed by the sensing means. In this manner, the statistical distribution of the generated signal tends to more closely approach the specified statistical distribution.

In the preferred embodiment of the invention, the specified statistical distribution is a Gaussian distribution. In this embodiment, the processing means is operative to sum a group of binary bits to generate a sum signal whose amplitude has an approximately binomial distribution with time. Also, in this embodiment the sensing means is responsive to only a portion or subset of the binary bits of the group, and the sensing means detects preselected combinations, such as all-ones or all-zeros, of the subset of the binary bits. When these predetermined combinations are detected, a unit is either added to or subtracted from the sum signal. By so doing, a modified sum signal is obtained which tends to approach a Gaussian distribution more closely than would an unmodified binomial distribution obtained from the same group of binary bits.

Further features and advantages of the invention will become more readily apparent from the following detailed description when taken in conjunction with the accompanying drawings.

DESCRIPTION OF THE PREFERRED EMBODIMENT

Figure 1:
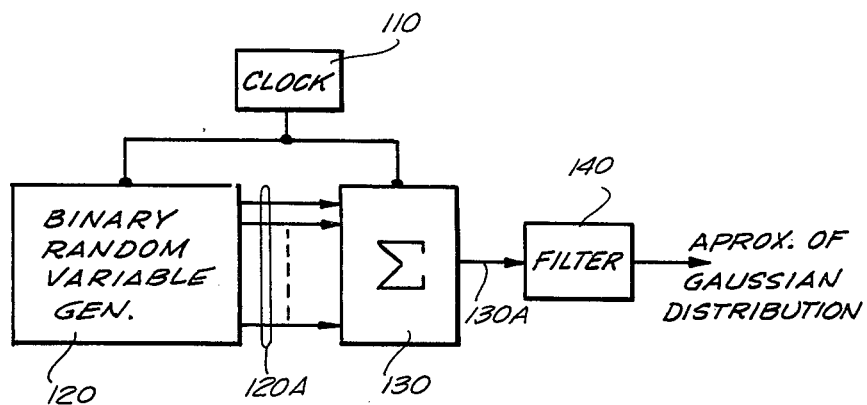
FIG. 1 is a block diagram of a prior art system for obtaining a noise signal output having Gaussian distributed amplitudes.
Figure 2:
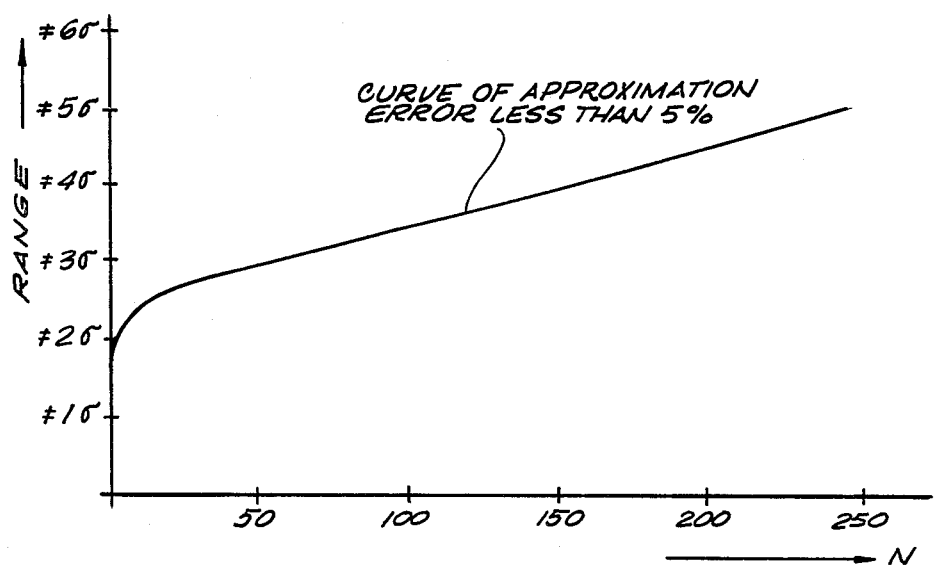
FIG. 2 is a graph which shows the curve of a less than 5% approximation error for a binary approximation of a Gaussian distribution as a function of the number of binary random variables, N, for the system of FIG. 1.

Referring to FIG. 1, there is shown a block diagram of a prior art system for obtaining a noise signal output having Gaussian distributed amplitudes. A clock 110 provides clock pulses to a binary random variable generator 120 and to a summing circuit 130. At each clock pulse, the binary random variable generator generates N pseudo-random binary bits on N output lines 120A, and the summing circuit 130 is operative to sum the total of the binary bits (for example, the total of the logical "1"s to obtain an output on line 130A. This output is coupled to a filter 140 which removes the clock frequency, and the output on line 140A is a signal whose amplitude is binomial distributed with time and approximates a Gaussian distribution. The system of FIG. 1 may be, for example, of the type set forth in the U.S. Pat. No. 3,885,139 or, if the binary random variable generator is a specially configured pseudo-random bit generator, the system of FIG. 1 will be in accordance with apparatus set forth in the above-referenced copending U.S. application Ser. No. 945,163. Also, the binary random variables may be generated simultaneously and added, or may be generated sequentially at a higher rate and added or counted as each group of N bits is obtained. In any event, the degree to which the output signal approximates a true Gaussian distribution is dependent upon the size of N. In particular, the Central Limit Theorem states that as N (the number of binary random variables which are summed) gets larger, the statistics of the sum approaches a true Gaussian distribution. Conversely, the statistics of the sum deviates from a true Gaussian distribution as N is made smaller. The percent error of the FIG. 1 system's binary approximation to a Gaussian curve varies over the curve, being smallest near the mean and largest further away from the mean. In other words, for the more likely sums near the mean value (of N/2) the binary and Gaussian distributions track closely, whereas for the less likely sums toward zero or N the binary distribution deviates to a greater extent from a true Gaussian curve. FIG. 2 illustrates this phenomenon, and shows the curve of a less than 5% approximation error for a binary approximation of a Gaussian distribution as a function of the number of binary random variables, N. The ordinate axis is in terms of the distance from the mean of the distribution (N/2), and is measured in terms of the number of standard deviations from the mean. Thus, for example, at N=50 random variables, the binary distribution approximates a true Gaussian distribution with less than 5% error out to about three standard deviations on each side of the mean, whereas at N=200 random variables a less than 5% error can be expected out to about four and a half standard deviations on each side of the mean.

One can also plot, for a particular number of random variables, the percentage error of the binary approximation of a Gaussian distribution, as a function of the number of standard deviations from the mean. For example, in FIG. 3 the graphs are for N=28 random variables, and the solid curve 15 represents the percentage error plotted as a function of number of standard deviations from the mean for a prior art configuration of the type shown in FIG. 1. The dashed curve pertains to the improvement of the present invention and will be described hereinbelow.

Figure 4:
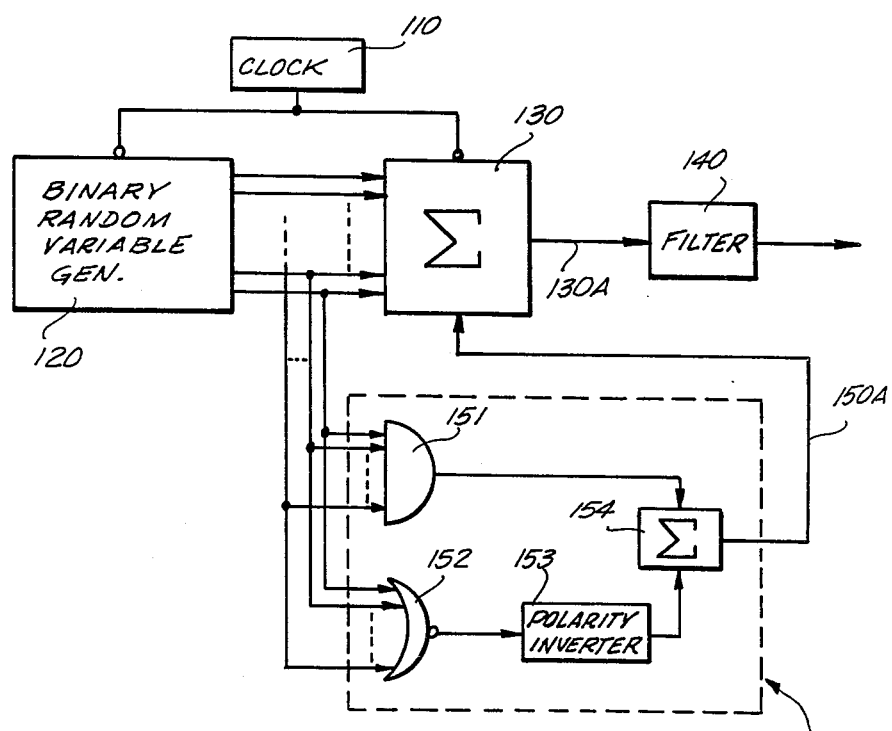
FIG. 4 is a block diagram of an embodiment of the improved system in accordance with the invention.

Referring to FIG. 4, there is shown an embodiment of a noise generator apparatus in accordance with the improvement of the invention, and which can be utilized to practice the method of the invention. The binary random variable generator 120, clock 110, summing circuit 130 and filter 140 may be of similar construction to those of the FIG. 1 apparatus. In the FIG. 4 embodiment, however, the group of N binary bits output from generator 120 are also coupled to circuitry 150 which senses or detects at least one characteristic of the group of binary bits. When this characteristic is detected by circuitry 150, a modifying signal is produced on the line 150A which is coupled to summing circuit 130 and operates to modify the sum that would otherwise be produced by summing circuit 130. In particular, the sensing circuitry 150 of the present embodiment is called a "subset corrector" and is responsive to only a subset or portion, R, of the N binary random variables which are output from generator 120. The R binary bits are coupled to an AND gate 151 and also to a NOR gate 152 in circuitry 150. The output of NOR gate 152 is coupled to a polarity inverter 153, and the outputs of polarity inverter 153 and AND gate 151 are combined by summing circuit 154. The output of the summing circuit 154 is the signal on line 150A which constitutes the output of circuitry 150 and is an input to summing circuit 130.

In operation of the embodiment of FIG. 4, AND gate 151 produces an output whenever the subset of R bits are all ones, whereas NOR gate 152 produces an output whenever the subset of R bits are all zeros. If the subset of R bits consists of mixed ones and zeros, neither of the gates 151 and 152 produces an output. Accordingly, and since the polarity of the output of NOR gate 152 is inverted by polarity inverter 152, the output of summing circuit 154 will be +1 when the subset of R bits are all ones, will be −1 when the subset of R bits are all zeros, and will be 0 in all other cases. The output of summing circuit 154 serves as a modifying signal which is coupled to summing circuit 130 and modifies the output thereof in accordance with the stated rules. It is seen that this modification tends to increase expected higher sum signals and decrease expected lower sum signals, and this modification reduces error in the binary approximation of a Gaussian distribution since a part of the error of the (uncorrected) binary approximation results from its tailing off too quickly at the extreme ends. Applicant has determined, by simulation, that the optimum value of R is in the range of about N/4.

Figure 3:
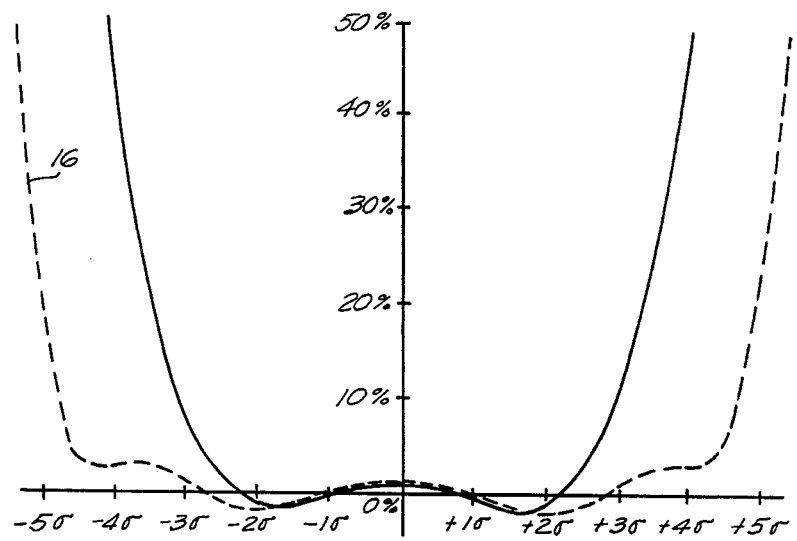
FIG. 3 is a graph which compares the percentage error of a binary approximation of a Gaussian distribution for a prior art system and a system in accordance with the improvement of the invention.

The improved performance obtained utilizing the present invention is illustrated by the dashed line curve 16 of FIG. 3. Twenty-eight binary random variables are again used (as was the case for the solid line curve 15 representing the performance of the FIG. 1 system), but in this case the subset corrector 150 (FIG. 4) receives eight of the binary bits and generates the modifying signal on line 150A as described above. The improvement in performance is seen to be substantial. For example, the dotted horizontal line indicates an approximation error level of 3.83%, and it is seen that for the system of FIG. 1 (solid line curve 15) this error level holds only out to about plus or minus $2\frac{3}{4}$ standard deviations, whereas for the improved system of FIG. 4 (dashed line curve 16), this error level holds out to about plus or minus $4\frac{1}{2}$ standard deviations. Stated another way, the approximation error out at $4\frac{1}{2}$ standard deviations from the mean is less than 4% for the improved system, whereas it is seen to be much greater than 50% for the system of FIG. 1.

The invention has been described with reference to a particular illustrative embodiment, but variations within the spirit and scope of the invention will occur to those skilled in the art. For example, it will be recognized that improved approximations of a desired statistical distribution can be obtained using alternative subset correction criteria.

I claim:

1. Apparatus for digitally generating a specified statistical distribution, comprising:

means for producing digital bits having properties of randomness;

processing means coupled to said producing means and being responsive to a group of said digital bits for generating a signal which approximates the specified statistical distribution;

sensing means also coupled to said producing means and being responsive to said group of digital bits for sensing at least one characteristic of said group of bits; and means coupled to said sensing means and said processing means for modifying the signal generated by said processing means whenever said characteristic is sensed by said sensing means, such that the statistical distribution of the generated signal tends to more closely approach the specified statistical distribution.

2. Apparatus as defined by claim 1 wherein said sensing means is responsive to only a portion of said group of digital bits.

3. Apparatus as defined by claim 1 wherein said specified statistical distribution is a Gaussian distribution.

4. Apparatus as defined by claim 2 wherein said specified statistical distribution is a Gaussian distribution.

5. Apparatus for digitally generating a noise signal having a substantially Gaussian distribution with time, comprising:
   clock means for generating clock pulses;
   means responsive to said clock pulses for producing pseudo-random binary bits;
   means for summing a group of said binary bits to generate a sum signal having an approximately binomial distribution with time;
   sensing means coupled to said means for producing binary bits and being responsive to at least a portion of the binary bits of said group for detecting at least one preselected combination of the binary bits of said portion of the binary bits; and
   means coupled to said sensing means and to said summing means for modifying said sum signal when said predetermined combination is detected such that the modified sum signal tends to more closely approach a Gaussian distribution with time.

6. Apparatus as defined by claim 5 wherein said sensing means is responsive to an all-ones or all-zeros combination in said portion of binary bits.

7. Apparatus as defined by claim 6 wherein modifying means is operative to add to said sum when said sensing means detects an all-ones condition, and to subtract from said sum when said sensing means detects an all-zeros condition.

8. Apparatus as defined by claim 5 wherein said group of binary bits is a group of N bits and said portion of bits is a subset of R bits, where R is in the range of about N/4.

9. Apparatus as defined by claim 6 wherein said group of binary bits is a group of N bits and said portion of bits is a subset of R bits, where R is in the range of about N/4.

10. Apparatus as defined by claim 7 wherein said group of binary bits is a group of N bits and said portion of bits is a subset of R bits, where R is in the range of about N/4.

11. A method for digitally generating a specified statistical distribution, comprising the steps of:
    producing digital bits having properties of randomness;
    generating, in response to a group of said digital bits, a signal which approximates the specified statistical distribution;
    sensing at least one characteristic of said group of digital bits; and
    modifying the generated signal whenever said characteristic is sensed, such that the statistical distribution of the generated signal tends to more closely approach the specified statistical distribution.

12. The method as defined by claim 11 wherein said sensing is responsive to only a portion of said group of digital bits.

13. The method as defined by claim 11 wherein said specified statistical distribution is a Gaussian distribution.

14. The method as defined by claim 12 wherein said specified statistical distribution is a Gaussian distribution.

15. A method for digitally generating a noise signal having a substantially Gaussian distribution with time, comprising the steps of:
    generating clock pulses;
    producing pseudo-random binary bits in response to said clock pulses;
    summing a group of said binary bits to generate a sum signal having an approximately binomial distribution with time;
    detecting at least one preselected combination in a portion of the binary bits; and
    modifying said sum signal when said predetermined combination is detected, such that the modified sum signal tends to more closely approach a Gaussian distribution with time.

16. The method as defined by claim 15 wherein said detection is responsive to an all-ones or all-zeros combination in said portion of binary bits.

17. The method as defined by claim 16 wherein said modifying step comprises adding to said sum when an all-ones condition is detected, and subtracting from said sum when an all-zeros condition is detected.

18. The method as defined by claim 15 wherein said group of binary bits is a group of N bits and said portion of bits is a subset of R bits, where R is in the range of about N/4.

19. The method as defined by claim 16 wherein said group of binary bits is a group of N bits and said portion of bits is a subset of R bits, where R is in the range of about N/4.

20. The method as defined by claim 17 wherein said group of binary bits is a group of N bits and said portion of bits is a subset of R bits, where R is in the range of about N/4.

21. In an apparatus for digitally generating a specified statistical distribution, said apparatus including means for producing digital bits having properties of randomness and processing means responsive to a group of said digital bits for generating a signal which approximates the specified statistical distribution; a subsystem for improving the statistical integrity of said signal, comprising:
    sensing means coupled to said producing means and being responsive to said group of digital bits for sensing at least one characteristic of said group of bits; and
    means coupled to said sensing means and to said processing means for modifying the signal generated by said processing means whenever said characteristic is sensed by said sensing means, such that the statistical distribution of the generated signal tends to more closely approach the specified statistical distribution.

22. The subsystem as defined by claim 21 wherein said sensing means is responsive to only a portion of said group of digital bits.

23. The subsystem as defined by claim 21 wherein said specified statistical distribution is a Gaussian distribution.

24. The subsystem as defined by claim 22 wherein said specified statistical distribution is a Gaussian distribution.

25. In an apparatus for digitally generating a noise signal having a substantially Gaussian distribution with time, said apparatus including clock means for generating clock pulses, means responsive to said clock pulses for producing pseudo-random binary bits, and means for summing a group of said binary bits to generate a sum signal having an approximately binomial distribution with time; a subsystem for improving the statistical integrity of said sum signal, comprising:

sensing means coupled to said means for producing binary bits and being responsive to at least a portion of the binary bits of said group for detecting at least one preselected combination of the binary bits of said portion of the binary bits; and means coupled to said sensing means and to said summing means for modifying said sum signal when said predetermined combination is detected such that the modified sum signal tends to more closely approach a Gaussian distribution with time.

26. The subsystem as defined by claim 25 wherein said sensing means is responsive to an all-ones or all-zeros combination in said portion of binary bits.

27. The subsystem as defined by claim 26 wherein modifying means is operative to add to said sum when said sensing means detects an all-ones condition, and to subtract from said sum when said sensing means detects an all-zeros condition.

28. The subsystem as defined by claim 25 wherein said group of binary bits is a group of N bits and said portion of bits is a subset of R bits, where R is in the range of about N/4.

29. The subsystem as defined by claim 26 wherein said group of binary bits is a group of N bits and said portion of bits is a subset of R bits, where R is in the range of about N/4.

30. The subsystem as defined by claim 27 wherein said group of binary bits is a group of N bits and said portion of bits is a subset of R bits, where R is in the range of about N/4.

* * * * *